July 21, 1964   H. HARTMANN ETAL   3,141,345
TORQUE-TRANSFORMER
Filed Nov. 28, 1961   3 Sheets-Sheet 3
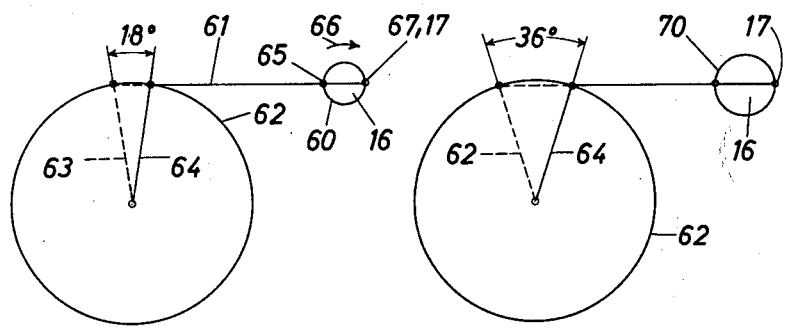
Fig. 7   Fig. 8
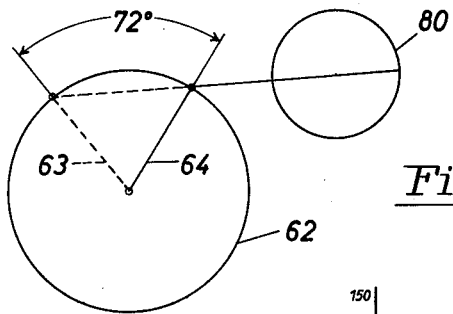
Fig. 9
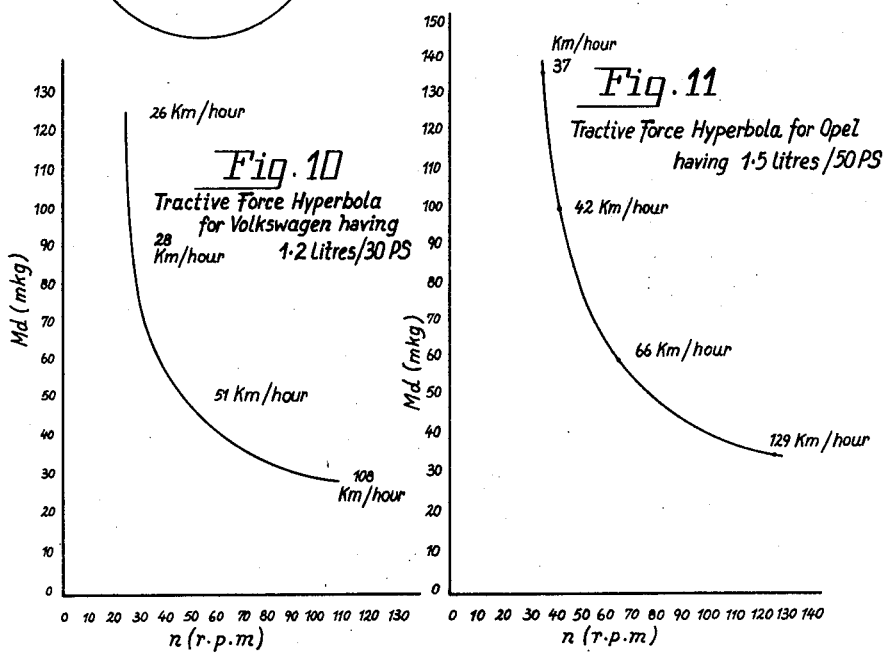
Fig. 10 — Tractive Force Hyperbola for Volkswagen having 1·2 Litres/30 PS
Fig. 11 — Tractive Force Hyperbola for Opel having 1·5 litres/50 PS
INVENTORS
BY

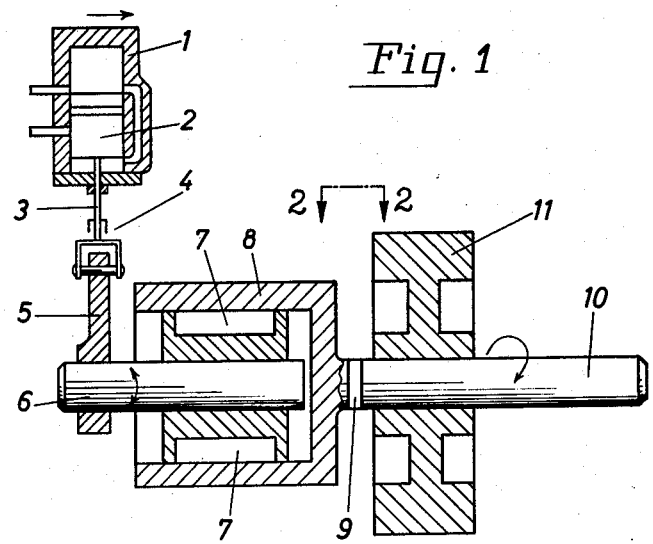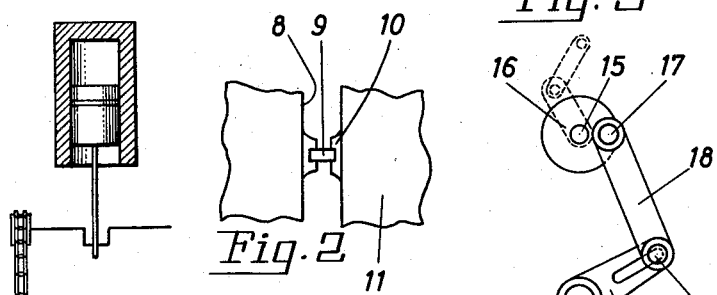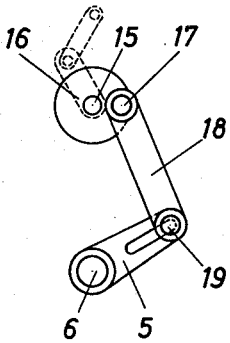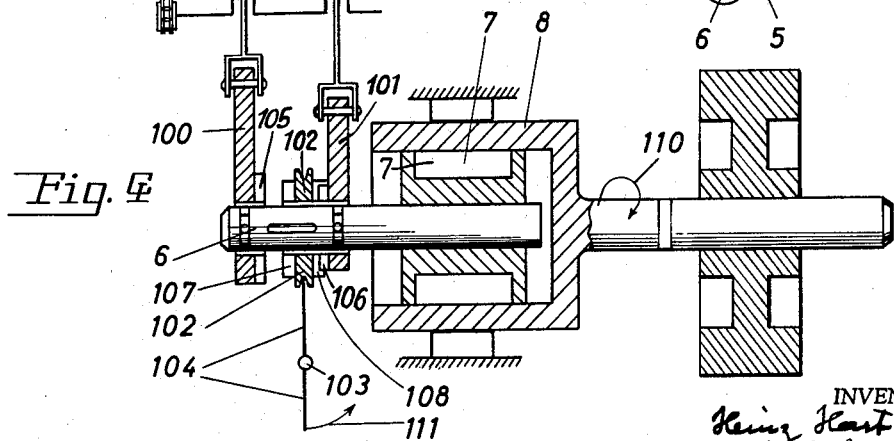

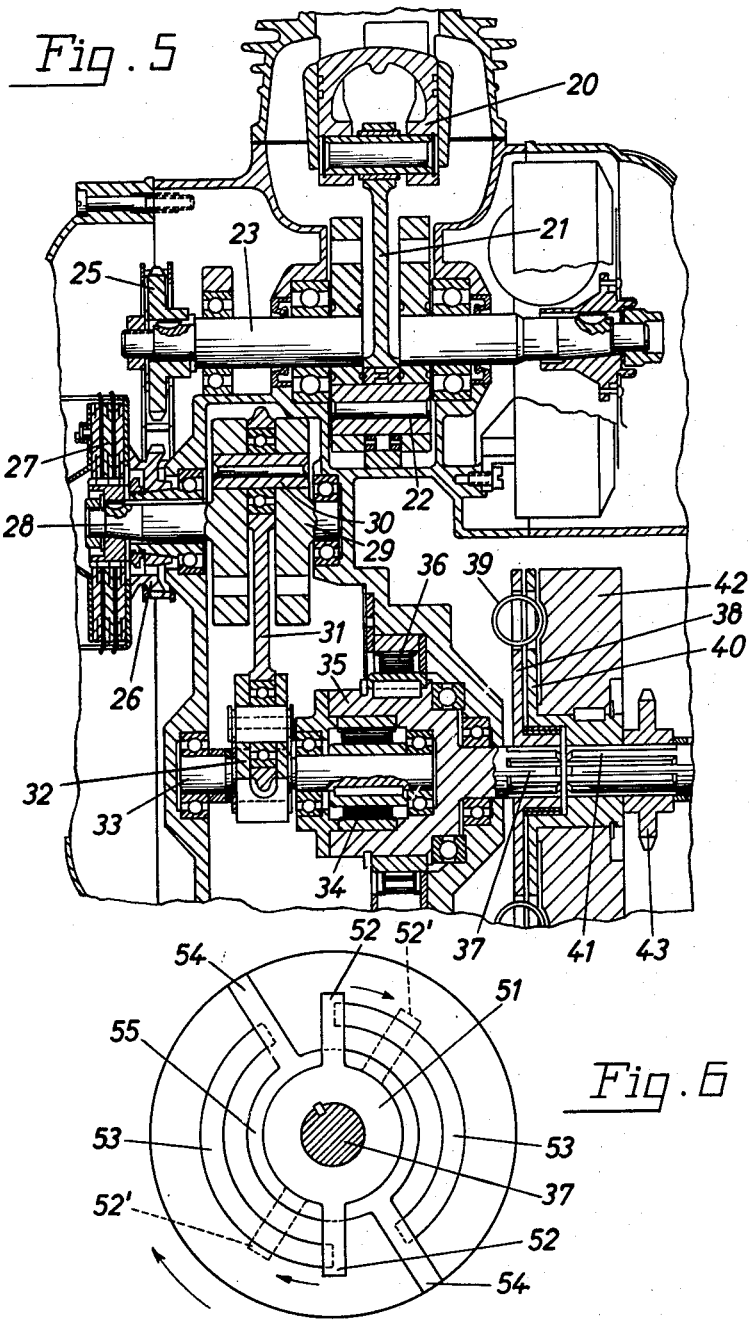

United States Patent Office 3,141,345
Patented July 21, 1964

3,141,345
TORQUE-TRANSFORMER
Heinz Hartmann, Bergrheinfeld, Schweinfurt, and Adolf Weber, Schweinfurt, Germany, assignors to Firma Stanley-Works G.m.b.H., Velbert, Rhineland, Germany, a corporation of Germany
Filed Nov. 28, 1961, Ser. No. 155,356
Claims priority, application Germany Dec. 9, 1960
7 Claims. (Cl. 74—142)

The present invention relates to a torque-transformer in general, and, in particular, to a torque-transformer for a power source, for instance for a piston motor having an output shaft.

It is known, for instance, to connect the piston of a motor with a crank by means of a connecting rod, which crank operates an output shaft by means of a gear drive serving as a torque-transformer. The gear drive is rather expensive and is limited basically to given transmission-values and conditions. The same applies also for motor types, which are equipped with a piston having a piston rod rigidly secured thereto. Turbines, electric motors need likewise gear drives or the like as torque-transformers.

It is one object of the present invention to provide a torque-transformer which is of simple structure and which constitutes an automatically shiftable change speed gear by arrangement of simple additional means.

It is another object of the present invention to provide a torque-transformer, wherein at least one lever swingable about a pivot point is provided, the free end of the lever cooperating with a reciprocating member, for instance, the piston of a motor or a crank of a power source, while a coupling member provided at the point of each lever joins the output shaft in one rotary direction of the lever, while the coupling member is disengaged from the output shaft during rotation in the other direction. The advantage resides in the fact that this torque-transformer is of simple structure and can be formed as automatic or manually shiftable speed change drive by adding additional arrangements, as will be set forth below.

Particularly the above-stated arrangement operates like an automatic speed change gear, if the output shaft comprises an output shaft part, and a power take-off shaft part, an elastically operating member being disposed between these two last-mentioned parts upon rotation of the shafts. This elastic member has the effect that the resistance encountered on the power take-off shaft part is not directly countering the power feed to the output shaft part, rather that this resistance is assumed by the elastic member, for instance a spring. This arrangement brings about, that the power output of the piston of the motor feeds only partly the power output shaft part, while it stores the power output partly in the spring. The gearing down, determined by the rotary path of the rotary point of the lever, is reduced for the value, depending upon the compression of the spring. The energy stored in the spring shows its effect then during the return stroke of the piston upon the power output part and can support the return stroke of the piston, respectively.

With these and other objects in view, which will become apparent in the following detailed description, the present invention will be clearly understood in connection with the accompanying drawings, in which:

FIGURE 1 is an axial section of a piston motor with a section of the torque-transformer designed in accordance with the present invention, and shown schematically;

FIG. 2 is a fragmentary top plan view of the portion 2—2 of FIG. 1;

FIG. 3 is a side elevation of another embodiment of the drive groove of the torque-transformer shown in FIG. 1;

FIG. 4 is an axial section of still another embodiment of the present invention;

FIG. 5 is a section of a motor connected with still another embodiment of the torque-transformer;

FIG. 6 is a schematic end view of a machine group of the torque-transformer shown in FIG. 5;

FIGS. 7 to 9 are diagrammatic showings of a crank rotation at different angular strokes of the lever; and FIGS. 10 and 11 are diagrams denoting the tractive force hyperbolas of different motors.

Referring now to the drawings, and in particular to FIG. 1, the motor comprises a cylinder 1 having a piston 2 reciprocating therein, a piston rod 3 being rigidly secured to the piston 2, which piston rod 3 operates a lever 5 over a link group 4. The maintenance of the reciprocating movement of the piston 2 is supported by a known balancing device (not shown).

The lever 5 is secured to a shaft 6 serving as rotating axis, which shaft 6 operates a drum 8 by means of a known idle run roller 7, which drum operates an output shaft 10 having a flywheel 11 by intermeditae arrangement of a spring member 9 (FIG. 2). The spring member 9 is in this case a torsion rod of metal or rubber and can be of a length determining the turning spring stroke.

The operation of this device is performed in the following manner:

The reciprocating movement of the piston 2 in the cylinder 1 brings about a movement of the lever 5 in such manner that the shaft 6 of the lever 5 performs an oscillating movement about an angular path of, for instance, 18°. The idle run rollers 7 cause thereby, in known manner, the joining of the rotation of the drum 8 in one rotary direction. In the other rotary direction the coating roller 7 is not operatively connected with the drum 8. The latter transmits the power to the shaft 10, whereby the spring member 9 yields, so that the shaft 10 together with the fly wheel 11 stands behind the rotation of the drum 8, and performs, for instance, a rotation of 10°, while 8° is assumed by the spring member 9. Since the drum 8 is not secured against its return stroke, the force or the energy stored in the spring member 9 supports the return movement of the piston 2 and will be transmitted partly to the output shaft 10. The gearing down has thus a value of $$\frac{360}{10} = 36:1$$

If, however, the resistance of the output shaft 10 is so small, that the spring member 9 does not yield, the gearing down has a value of $$\frac{360}{18} = 20:1$$

In this example, an endless automatically shiftable reduction gear is achieved, which operates between the values of 36:1 and 20:1.

The motor can also operate in such manner, that the piston 2 works over a connecting rod (not shown) upon a crank of a crank shaft 15, on which is disposed a disk crank 16, the crank link 17 of which operates a pin 19 by means of a link 18, the pin 19 being disposed on the equally formed lever 5 of the shaft 6 (FIG. 3). Since the distance between the pin 17 and the crank shaft 15 is smaller than the distance of the pin 19 from the shaft 6, the lever 5 performs an oscillating movement, for instance of 72°. This arrangement combined with the remaining parts disclosed in FIG. 1 brings about the above-described effect.

The pin 19 can also be disposed slidably on the lever 5, which arrangement is not shown. This permits that the length of the lever 5 depending upon the position of the pin 19 is adjustable to an endless number of positions to bring about rotations of the shaft 6 ranging, for instance, between 36° and 18°.

In FIG. 4, an example is disclosed of a part of a torque-transformer with two levers of different lengths, each of the levers corresponding to the lever 5 of FIG. 1. It is of course also possible to provide more than two levers.

A first long lever 100 is rotatably mounted on the shaft 6 and has, for instance, such a length that it performs in its rotary point an angular movement of 18°. A second shorter lever 101 is provided spaced apart from the lever 100, which shorter lever 101 performs an angular movement of 36° about its rotary point. This lever is likewise rotatable about the shaft 6. Both levers 100 and 101 are secured against axial movement on the shaft 6 by any suitable means (not shown). Between the levers 100 and 101 is provided a claw member 102, which is axially movable on the shaft 6, which claw member 102 cannot turn relative to the shaft 6. A shifting lever 104, swingable about a rotary point 103, serves the purpose of moving axially the claw member 102.

The levers 100 and 101 have claws 105 and 106 disposed opposite the claw member 102, while the claw member 102 has its claws 107 opposite the lever 100 and its claws 108 opposite the lever 101. The shaft 6 is equipped with an idle run roller 7 which cooperates with the drum 8.

The operation takes place now in the following manner:

Both levers 100 and 101 are continuously driven by the motor in the manner disclosed in connection with the embodiment shown in FIG. 1. If the claw member 102 is disposed in the center between the two levers 100 and 101, no transmission of the movements onto the shaft 6 takes place. If, however, the claw member 102 is shifted into the position shown in FIG. 4, by means of the shifting lever 104, the lever 101 transmits its movement by means of its claws 106 onto the claws 108 of the claw member 102, so that the shaft 6 joins now the turning movement and, thereby, joins the rotary movement for 36° for two reciprocating tacts of the lever 101. In this case the idle run roller 7 joins the drum 8 successively and turns in one rotary direction indicated by the arrow 110. The drum turns accordingly comparatively fast.

If the shifting lever 104 is moved in the direction of the arrow 111, so that the claws 105 of the lever 100 engage the claws 107 of the claw member 102, the shaft 6 is joined for a movement by the lever 100 and reciprocated for two tacts of the lever 100, for an angle of 18° whereby the shaft 6 turns the drum 8 in the direction of the arrow 110 in one direction by means of the idle run roller 7. The drum 8 thus moves with a smaller number of revolutions.

This movement brings about thus a shiftable two-step drive with idle run.

In case of applying three levers in the above-stated arrangement, advantageously, the angular movements are selected as 18°, 36° and 72°.

In a similar manner two or more levers can be arranged such that one of the levers stands for the return movement, by connecting this one lever with an idler run roller operating or serving as a coupling, which idler run roller operates in opposite direction compared with the idler run roller 7. In this case an apparatus is created with one or a plurality of forward drives and one reverse drive.

FIG. 5 discloses, in the form of a practical embodiment, a partly shown two-tact motor with the torque-transformer designed in accordance with the present invention, the piston 20 of the motor operating on a crank pin 22 of a crank shaft 23 by means of a connecting rod 21, which crank shaft 23 is rotatably mounted in a housing 24.

The crank shaft 23 carries a chain wheel 25 which operates by means of a chain (not shown) a second chain wheel 26 having a coupling 27. The coupling 27 is disposed on a shaft 28 mounted in the housing 24 and having a crank 29, which drives the lever 32 by means of a crank pin 30 of the crank 29 and a connecting rod 31, which lever 32 is disposed on the shaft 33.

The shaft 33 carries the idler run rollers 34, described in connection with the embodiment of FIG. 1, which operates the drum 35, which in turn is secured against return movement by means of a coaster brake 36 operating in one rotary direction. An output shaft 37 of the drum 35 is equipped with a flange 38, the spring member 39 of which operates a flange 40 arranged independently from the flange 38, which flange 40 is provided on a power output shaft part 41. The latter carries a fly wheel 42 and a gear 43 for the power output.

The operation takes place in the following manner:

The piston 20 transmits in known manner each power stroke by means of the connecting rod 21 to the crank 22, whereby the shaft 23 is rotated. The chain wheel 25 transmits the rotation of the shaft 23 onto the chain wheel 26 by means of a chain (not shown). If the coupling 27 is in operative coupling position, this movement is further transmitted by means of a shaft 28 onto the crank 29, the crank pin 30 of which oscillates the lever 32 by means of the connecting rod 31. The shaft 33, operating as axle for the lever 32, transmits the movement onto the drum 35 in one direction by means of the idler run rollers 34, while in the opposite direction the idler run rollers 34 are separated from the drum 35 and return freely. The drum 35 rotating in one direction transmits the power onto the flange 38 by means of an output shaft part 37, which flange 38 operates the flange 40 of the power output shaft part 41 by means of the spring member 39. The power output shaft part 41 transmits the power onto a member to be driven by means of the gear 43, whereby the fly wheel 42 secures the desired effect and uniformity of the movement. In order to prevent the return movement of the drum 35 by means of the spring member 39 during the return movement of the lever 32 and the release of the idler run rollers 34, the brake 36 is provided. The power stored in the spring member 39 has its effect during the idler stroke of the lever 32 upon the gear 43. An automatically shiftable reduction gear is thus created.

Referring now to FIG. 6 of the drawings, another embodiment of the spring member is shown schematically, which spring member is provided between the drum 35 and the power output shaft part 41 of the machine, as shown in FIG. 5. The output shaft 37 which is connected with the drum 35, carries in this embodiment a flange 51 having two arms 52. One end of a screw pressure spring member 53 engages each arm 52. The other end of the spring members 53 engages the arms 54, which are secured to a flange 55 provided on the power output shaft part 41 which is not visible in FIG. 6. As is shown, however, in the drawings, the arms 52 are brought in the position 52' shown in dotted lines during the rotation of the power output shaft part 37 as a result of the above-described effect, if the resistance of the power output shaft part 41 is so great, that the spring members 53 are compressed. By this arrangement the above-described effect is brought about, that means the automatic change of the speed reduction of the torque-transformer in dependency upon the resistance.

The spring members 9, 39, and 53 can be also left out. In this case a non-automatically shiftable torque-transformer is presented.

FIGS. 7 to 9 show now how the apparatus disclosed in FIGS. 1 and 3, however, without a spring member, operates with an 18°, 36° and 72° angular movement of the lever 5.

FIG. 7 shows the circle 60 of the pin 17 of the disk crank 16. The connecting rod 61 of the pin 17 brings about the effect that, upon a half rotation of the disk crank 16, the pin 17 performs a movement from the point 65 in the direction of the arrow 66 to the point 67 and the arm 5 performs such a movement that it moves from the position 63 shown in dotted lines to the position 64 shown in full lines.

The angular movement amounts to 18°. FIG. 7 shows also a peripheral line of a wheel which continues its movement during each rotation of the disk crank 16 for 18° in the direction of the arrow.

Thus, for instance, the following driving conditions result:

The disk crank 16 performs 3,140 r.p.m. At an angular displacement of 18° a reduction of 360°:18°=20:1 is present. The wheel indicated by the circle 62 performs also 157 r.p.m. If now the circle 62 is a wheel, which has a periphery of 0.314 m., the wheel runs on a road 157×0.314=49,298 m. per minute.

FIG. 8 shows the same arrangement as described in connection with FIG. 7, however, with a disk crank, the pin 17 of which describes such a large rotary circle 70, that the lever 5 performs an angular stroke of 36° during one rotation of the disk crank 16 to assume the position 64. In this case a reduction of 360°:36=10:1 is present, so that the wheel 62 identical with the circle 62 performs under the above conditions 314 r.p.m., so that with a periphery of 0.314 m. the wheel runs 98,596 m. per minute.

As shown in FIG. 9, the pin 17 performs a circle 80 of such diameter that the lever 5 reaches from the starting position 63 the end position 64 during each rotation of the pin 17 performing an angular stroke of 72°. In this case the wheel 62 makes under the above-stated conditions 628 r.p.m. and moves on a road for a length of 197,192 m. per minute.

In the embodiment shown in FIG. 7, a speed of 18 km./hour is achieved, in the embodiment according to FIG. 8 a speed of about 37 km./hour and in the embodiment according to FIG. 9 a speed of about 75 km./hour is obtained.

FIGS. 10 and 11 show tractive force hyperbolas of a torque-transformer having a 60° rotary path and a spring path, which is effective in view of the spring 39 shown, by example, in FIG. 6.

For a Volkswagen having a 1200 ccm. motor and having a spring path of up to 45°, the following values result, as indicated in the tractive force hyperbola of FIG. 10:

(Torque-transformer for a Volkswagen having a 1200 ccm. engine)

Motor: 30 PS/3400 r.p.m.; md. 7.7 mkg./2000 r.p.m.
Transformer: drive transmission 1:1.5
Number of revolutions of the transformer: 3400 r.p.m. 1.5=5100 r.p.m.

Turning moment of the transformer $=\frac{7.7 \text{ mkg.}}{1.5}=5.13 \text{ mkg.}$ Swinging range of the lever=60°

Geometrical tact number $\frac{360°}{60}=6$

Spring path=45°
Relative swinging range of the lever to the output= 60°—45°=15°

Maximum tact number $=\frac{360°}{15°}=24$

Turning moment at a driving angle: of 60°=5.13 mkg.; 6=30.78 mkg.; of 15°=5.13 mkg.; 24=123.0 mkg.
Number of revolutions of the take-off at full load:

$30.7 \text{ mkg.}=\frac{5100}{6} \text{ r.p.m.}=850 \text{ r.p.m.}$ $123.0 \text{ mkg.}=5100\frac{\text{r.p.m.}}{24}=212 \text{ r.p.m.}$ Speed of the vehicle: 850 r.p.m. .2.60=108 km./hour; 212 r.p.m. .2.60=25 km./hour; 5.13 mkg. have been assumed as median md.

Thus without shifting a speed between 25 and 108 km./hour can be obtained, while the number of revolutions of the engine is the same. If it is now considered, that the motor can be throttled, for instance, up to 1000 revolutions, an endless automatically working transmission results, which transmits between 5 and 108 km./hour.

Further values of a torque-transformer for an Opel-motor having 1.5 liters at a 42.6° spring path, as shown in the tractive force hyperbola in FIG. 11, are:

Motor: 50 PS/4300 r.p.m.; md.: 10.8 mkg./2200 r.p.m.
Transformer drive ratio 1:1.5

Number of revolutions of the transformer $$=\frac{10.0}{1.5} \text{ mkg.}=6.6 \text{ mkg.}$$

Swinging range of the lever=60°

Geometrical tact number $=\frac{360°}{60°}=6$

Spring path=42.6°
Relative swinging range of the lever to the drive= 60°—42.6°=17.4°

Maximum tact number $=\frac{360°}{17.4}=20.6$

Rotary moment at a driving angle: of 60°=6.6 mkg. 6=39.6 mkg.; of 17.4°=6.6 mkg. 20.6=135.9 mkg.
Number of revolutions at take-off with full load $39.6 \text{ mkg.}=\frac{6450}{6} \text{ r.p.m.}=1075 \text{ r.p.m.}$ $135.9 \text{ mkg.}=\frac{6450}{20.6} \text{ r.p.m}=313 \text{ r.p.m.}$ Speed of the vehicle: 1075 r.p.m. .2.60=129 km./hour; 313 r.p.m. .2.60=37 km./hour (6.6 mkg. have been assumed as median md.).

Here results again the fact that by exploitation of a number of revolutions of 1000 r.p.m. with a throttled motor up to a number of revolutions of 4,300 r.p.m., speeds between 10 and 129 km./hour can be automatically obtained without shifting by the torque-transformer designed in accordance with the present invention.

While we have disclosed several embodiments of the present invention, it is to be understood that these embodiments are given by example only and not in a limiting sense, the scope of the present invention being determined by the objects and the claims.

We claim:

1. A torque transformer for translating power to a rotatable output member from a rotatable input member torsionally driven in one angular direction at periodic intervals comprising, an intermediate rotatable member, one-way drive means between the input member and the intermediate member, said drive means upon movement of the input member in said one angular direction driving the intermediate member in a first angular direction, means braking the movement of the intermediate member in the opposite angular direction, and coupling means providing a torque transmitting drive between the intermediate and output members, said coupling means being angularly elastic for storing torsional energy for subsequent transmission to the output member between said periodic intervals for driving the output member at a reduced drive ratio.

2. A torque transformer for transmitting power from a reciprocating element comprising, an output rotatable member, an intermediate rotatable member, one-way drive means between the reciprocating element and the intermediate rotatable member operable upon reciprocation of said element to drive the intermediate member in one angular direction at periodic intervals, means braking the movement of the intermediate member in the opposite angular direction, and coupling means between the intermediate and output members, said coupling means being angularly elastic for storing torsional energy for subsequent transmission to the output member between said periodic intervals thereby driving the output member at a reduced drive ratio.

3. A torque transformer for transmitting torque from a motor having a reciprocating piston comprising, an output rotatable member, a first intermediate rotatable member, a second intermediate rotatable member, force transmitting means between the piston and the first intermediate rotatable member operable upon reciprocation of said piston to angularly oscillate the first intermediate member, said force transmitting means being shiftable for varying the angular displacement of the first intermediate member to thereby change the drive ratio between the piston and the first intermediate member, one-way clutch means between the first and second intermediate members for driving the second intermediate member in one angular direction at periodic intervals, means braking the movement of the second intermediate member in the opposite angular direction, and coupling means between the second intermediate member and the output member, said coupling means being angularly elastic for storing torsional energy for subsequent transmission to the output member between said periodic intervals for driving the output member at a reduced drive ratio.

4. A torque transformer for translating power to a rotatable output member from a rotatable input member torsionally driven in one angular direction at periodic intervals comprising, an intermediate rotatable member having a relatively small moment of inertia, one-way drive means between the input member and the intermediate member, said drive means upon movement of the input member in said one angular direction driving the intermediate member in a first angular direction, means braking the movement of the intermediate member in the opposite angular direction, coupling means providing a torque transmitting drive between the intermediate and output members having a relatively large moment of inertia, and a flywheel connected to the output member, said coupling means being angularly elastic for storing torsional energy for subsequent transmission to the output member between said periodic intervals for driving the output member at a reduced drive ratio.

5. A torque transformer for transmitting torque from a motor having a reciprocating piston with a power stroke providing mechanical power at periodic intervals comprising, an output rotatable member, a first intermediate rotatable member, a second intermediate rotatable member having a relatively small moment of inertia, force transmitting means operatively connecting the piston and the first intermediate rotatable member, said force transmitting means upon reciprocation of said piston angularly oscillating the first intermediate member, one-way clutch means between the first and second intermediate members translating movement to the second intermediate member in one angular direction, means braking the movement of the second intermediate member in the opposite angular direction, coupling means between the second intermediate member and the output member, and a flywheel connected to the output member having a relatively large moment of inertia, said coupling means being angularly elastic for storing torsional energy for subsequent transmission to the output member between said periodic intervals for driving the output member at a reduced drive ratio.

6. A torque transformer for translating power from an input rotatable member to an output rotatable member comprising, a first intermediate rotatable member, a second intermediate rotatable member, force transmitting means operatively connecting the input member and the first intermediate member, said force transmitting means upon rotation of said input member oscillating the first intermediate member, said force transmitting means being shiftable for varying the angular displacement of the first intermediate member to thereby change the drive ratio between the input member and the first intermediate member, one-way clutch means between the first and second intermediate members for driving the second intermediate member in one angular direction, means braking the movement of the second intermediate member in the opposite angular direction, and coupling means between the second intermediate member and the output member, said coupling means being angularly elastic for storing torsional energy for subsequent transmission to the output member for driving the output member at a reduced drive ratio.

7. A torque transformer for translating power from a rotatable input member torsionally driven in one angular direction at periodic intervals comprising an output rotatable member, an intermediate rotatable member, one-way drive means between the input member and the intermediate member, said drive means upon movement of the input member in said one angular direction driving the intermediate member in a first angular direction, a flywheel driven by the output member, torsion rod coupling means providing a torque transmitting drive between the intermediate member and the output member, and means for operatively limiting the angular movement of the intermediate member to said first angular direction, said coupling means being angularly elastic for storing torsional energy for subsequent transmission to the output member metween said periodic intervals whereby the output member is driven at a variable drive ratio.

References Cited in the file of this patent
UNITED STATES PATENTS

| | | |
|---|---|---|
| 550,277 | Lambert | Nov. 26, 1895 |
| 2,199,111 | Minkowitz | May 31, 1938 |
| 2,384,110 | Malmquist | Sept. 4, 1945 |
| 2,981,118 | Morrill | Apr. 25, 1961 |
| 3,026,732 | Corvisier | Mar. 27, 1962 |